United States Patent Office 3,522,370
Patented July 28, 1970

3,522,370
COLOR DISPLAY SYSTEM EMPLOYING A
STRIPED PENETRATION TYPE CRT
Morton E. Jones, Richardson, and William H. Clingman,
Jr., Dallas, Tex., assignors to Texas Instruments Incorporated, Dallas, Tex., a corporation of Delaware
Filed June 15, 1967, Ser. No. 646,280
Int. Cl. H04n 9/22
U.S. Cl. 178—5.4
3 Claims

ABSTRACT OF THE DISCLOSURE

A color kinescope construction is disclosed in which a viewing screen is covered with a phosphor material which emits light of different colors when energized by electrons of different energies. The phosphor material covers the screen uniformly and is overlaid with a series of parallel conductive stripes. The thickness of the stripes is such that the energies of impinging electrodes are reduced in penetrating the stripes so that the phosphor material beneath the stripes emits light of a different color than the phosphor material which is not covered by the stripes. Alternate stripes are connected together at one side of the screen and the intervening stripes are connected together on the other side of the screen so that, as the screen is scanned by an electron beam, a potential difference comprising an indexing signal is generated between the two sets of stripes. The screen is scanned by a beam of electrons produced by a conventional electron gun. The indexing signal generated by the scanning of the beam is employed to control gating means for applying different color signals to the gun in sequence to vary the electron beam intensity as the beam traverses the covered and uncovered portions of the phosphor material respectively so that the signals produce image components in light of the respective colors.

---

Figure 1:
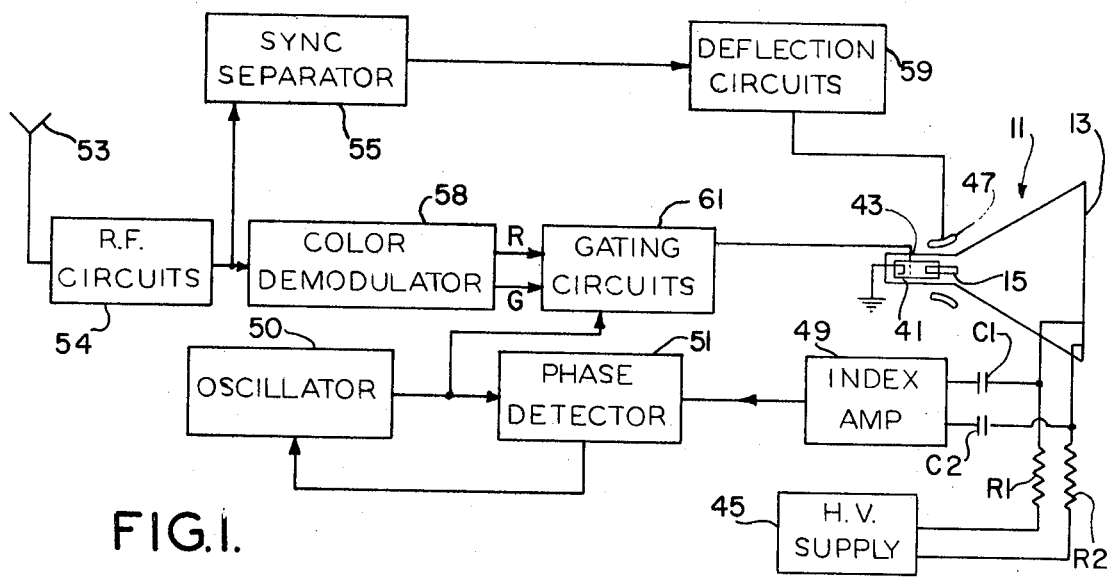

This invention relates to a color display system and more particularly to such a system employing a beam indexing kinescope.

Various beam indexing color display systems have been proposed heretofore in which the progress of an electron beam sweeping across a viewing screen is detected by means of index stripes on the screen. Typically these index stripes operate by means of a secondary emission characteristic, e.g., ultraviolet or X-ray radiation, which is subsequently detected to provide an indexing signal. The development of conductive indexing patterns on a viewing screen has been hampered by the capacitive coupling of the conductive pattern to electrical noise producing elements in the environment of the viewing screen, e.g., the deflection yoke normally employed for scanning a beam of electrons across the screen.

Among the several objects of the present invention may be noted the provision of a beam indexing color display system, the provision of such a system which generates an indexing signal directly from the display system viewing screen; the provision of such a system in which the indexing signal provided is relatively free of interfering electrical noise; the provision of such a system which provides accurate indexing of different color signals with respect to respective portions of a viewing screen; the provision of such a system which provides a display having high color resolution; the provision of such a system which is reliable; and the provision of such a system which is relatively simple and inexpensive. Other objects and features will be in part apparent and in part pointed out hereinafter.

Briefly, a color display system according to the present invention is operative to provide an image having a plurality of image components of different colors which are produced in response to respective color signals. The system includes a phosphor viewing screen which, when energized by impinging electrons, emits light of a first color from first portions thereof and emits light of a second color from second portions thereof. The aforesaid first and second portions are arranged in alternating, generally parallel stripes. The screen includes conductive index stipes extending parallel to the color stripes. Alternate ones of the index stripes are connected together on one side of the screen nad the intervening stripes are connected together on the other side of the screen thereby providing a pair of interleaved comb-like conductive structures. The system also incorporates means including an electron gun for scanning the screen with a beam of electrons thereby to produce light and to generate a potential difference comprising an indexing signal between the comb-like structures as they are scanned by the electron beam. Gate means are provided which respond to the indexing signal and which operate synchronously therewith for sequentially applying the different color signals to the gun to vary the electron beam intensity. The signals are applied in a sequence corresponding to the order in which the different aforesaid portions are arranged on the screen and accordingly the different signals produce image components in light of respective colors.

The invention accordingly comprises the constructions hereinafter described, the scope of the invention being indicated in the following claims.

Figure 2:
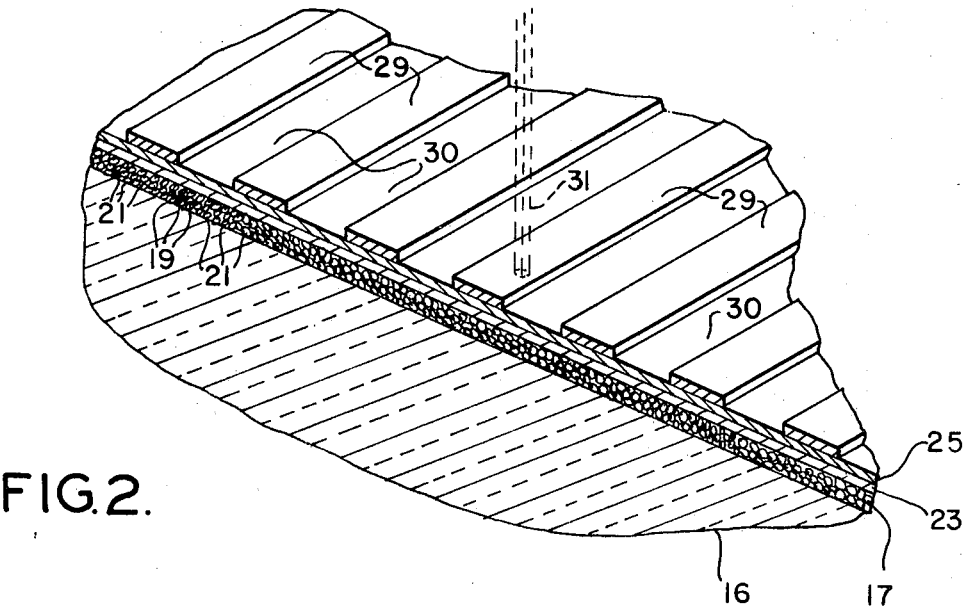
Figure 3:
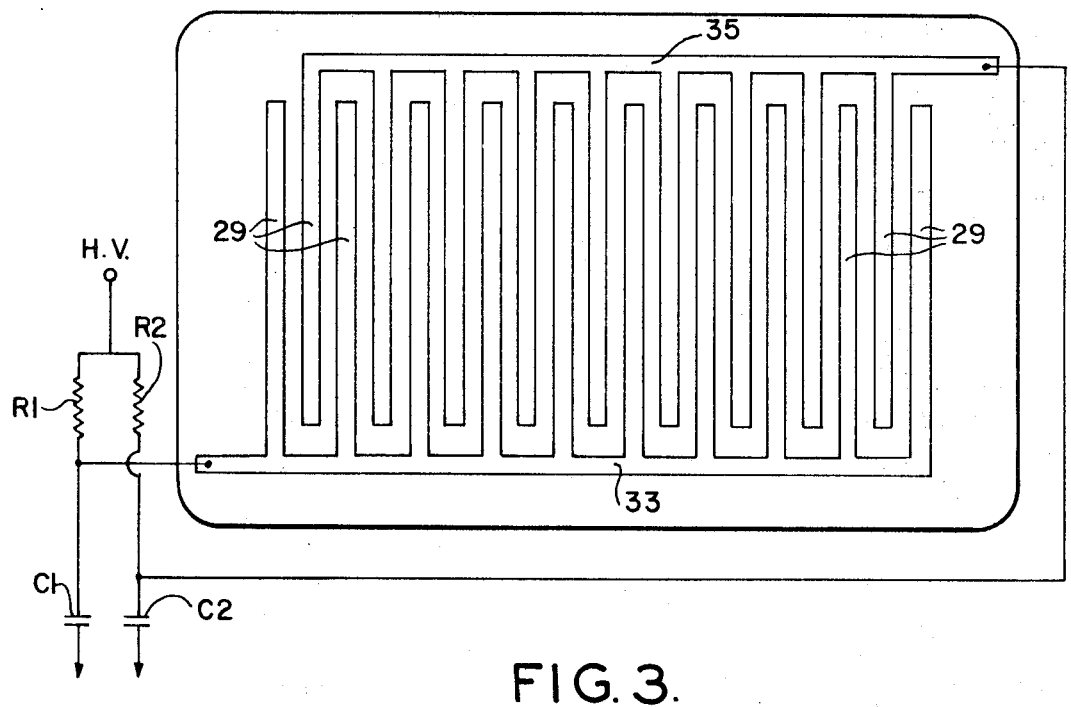

In the accompanying drawings in which one of various possible embodiments of the invention is illustrated, FIG. 1 is a block diagram of a color display system according to this invention;

FIG. 2 is a fragmentary view, in perspective, of a phosphor viewing screen employed in the system of FIG. 1; and FIG. 3 is a diagrammatic front view of the viewing screen.

Corresponding reference characters indicate corresponding parts throughout the several views of the drawings.

The color display system illustrated in FIG. 1 employs a kinescope 11 comprising a phosphor viewing screen 13 and an electron gun 15 for emitting a beam of electrons toward screen 13. Screen 13 is illustrated in greater detail in FIG. 2 and includes a glass face plate 16 which constitutes a substrate upon which is deposited a layer 17 of a phosphor material. Layer 17 is constituted by a random mixture of discrete red light emitting phosphor particles 19 and cyan light emitting particles 21. Each domain of layer 17 which may be scanned by an electron beam includes both kinds of particles.

The red light emitting phosphor particles 19 and the cyan light emitting particles 21 respond differently to impinging electrons having different energies or velocities. Particles 19 have a low energization threshold and are energized even when struck by electrons which have energies which are only above a relatively low level or threshold. The particles 21, however, emit cyan light only when struck by electrons which have energies above a predetermined higher threshold. Low energy electrons will thus energize only the particles 19 so that a red light is emitted while electrons having energies above the threshold of the particles 21 will energize both the red and the cyan light emitting particles so that light of a different color, substantially achromatic or white, will be emitted.

The difference in the sensitivities of the phosphors to electrons of different energies may be produced, for example, by providing a barrier layer on the cyan light emitting particles. The barrier layer produces a raised energy threshold which must be exceeded before the particle is energized to emit light. Alternatively, both types of particles 19 and 21 are provided with barriers, the cyan light emitting particles being given a thicker barrier to produce a desirable differential between the energy thresholds of the two different kinds of particles. A suitable barrier layer is a coating of silicon dioxide deposited on individual particles. This coating is deposited for example, by the cracking of a tetraethoxysilane atmosphere within which the phosphor particles are suspended. Other types of phosphor materials which emit light of different colors in response to electrons having different energies may also be used, e.g., phosphors of the type disclosed in the copending application Ser. No. 598,826 in which the hue of the light emitted from each phosphor particle varies as the electron energy varies.

Phosphor layer 17 is coated with an electron permeable aluminum film 23 by means of which an electron beam accelerating voltage may be applied to and distributed over the screen. Aluminum film 23 is in turn covered by a substantially insulating layer 25. This layer 25 may, for example, be formed by anodizing the aluminum film 23. The aluminum film 23 and insulating layer 25 are relatively thin so that the energies of electrons impinging thereupon are not substantially reduced by passing through these layers.

On top of the insulating layer 25 are a series of parallel aluminum stripes 29 which extend vertically across the screen leaving uncovered portions or areas 30 therebetween. The aluminum which constitutes the stripes 29 may be deposited through a mask to leave the uncovered areas 30 or may be deposited as a continuous layer, the aluminum in the areas 30 being later etched away. The aluminum which constitutes the stripes 29 is of appreciable thickness so that the energies of electrons impinging upon the areas covered by the stripes are appreciably reduced. Thus, the stripes 29 constitute a layer of energy absorbing material overlying selected portions of the phosphor layer 17. The particular thickness of the stripes 29 is adjusted so that electrons impinging with a predetermined energy above the threshold level of the cyan light emitting particles 21 will be reduced in energy to a level which is below the energization threshold of particles 21 and which is yet still high enough to effect energization of the particles 19. Accordingly, a beam of electron as indicated at 31 will, as it is scanned across screen 11, energize both kinds of phosphor particles 19 and 21 to produce white light in the screen portions 30 but will, when impeded by a stripe 29, energize only the particles 19 thereby producing red light. The positions of the indexing stripes thus define different portions of the screen which emit light of different colors. An alternative method of producing different colors of light in different portions of the screen is to deposit different phosphors in spaced parallel stripes which are interleaved with the index stripes as disclosed in copending application Ser. No. 643,530, filed June 5, 1967.

Alternate ones of the index stripes 29 are connected together on one side or edge of screen 13 and the intervening stripes are connected together along the other edge or side of the screen thereby providing a pair of interleaved comb-like structures 33 and 35 as shown in FIG. 3. In this figure, the stripes 29 are shown in enlarged scale in relation to the overall size of the viewing screen for purposes of illustration whereas in practice these stripes are closely spaced so that the stripe pattern is not distinguishable in viewing the displayed image.

Referring again to FIG. 1, gun 15 includes an electron emissive cathode 41 and a grid 43. Electrons emitted by gun 15 are accelerated toward screen 13 by a fixed high potential applied to the screen by a high voltage supply 45. The accelerating voltage is chosen to provide electron energies above the threshold of the cyan light emitting particles 21. As is understood by those skilled in the art, the intensity of the electron beam or the beam current is variable as a function of the voltage applied between the cathode 41 and the grid 43.

The beam of electrons emitted by gun 15 is subjected to the deflecting influence of magnetic fields generated by a conventional deflection yoke 47. Yoke 47 is energized, as is explained in greater detail hereinafter, to scan the beam of electrons over screen 13 in a raster comprising a series of horizontal lines. The beam is thus scanned transversely across the aluminum stripes 29.

The electron accelerating voltage provided by the supply 45 is applied to the comb-like index stripe structures 33 and 35 through respective isolating resistances R1 and R2 (see FIG. 3) and, as the beam of electrons emitted by gun 15 is scanned across the screen 13 by yoke 47, a pulsating potential is thus developed on each of these comb-like structures. If desired, the pulsating signal may be accentuated by connecting an inductor between the structures 33 and 35 to resonate with the distributed capacitance between the structures. The pulsating signals developed on the structures 33 and 35 are applied, through respective D.C. blocking capacitors C1 to C2, to an indexing signal amplifier 49 which is of the differential input type. Structures 33 and 35 each exhibit substantial capacitive coupling to their environment and thus tend to pick up substantial noise signals from various electrical noise producing elements such as yoke 47. Typically these noise signals will, in fact, exceed in absolute amplitude the potential difference generated between the structures by the scanning of the electron beam across the stripes 29. However, since the comb-like structures 33 and 35 are interlaced and substantially coextensive over the screen and are of substantially equal size, the respective noise signals will be substantially equal and in-phase whereas the indexing signal potentials generated on these structures are out-of-phase, that is, the index signal is generated between the structures. By applying the signals present on the structures 33 and 35 to respective inputs of a differential amplifier, such as that indicated at 49, the in-phase components of the signals are suppressed and the out-of-phase components are strongly amplified as is understood by those skilled in the art. The output signal from amplifier 49 thus comprises the desired indexing information substantially isolated from any interfering noise. The amplified index signal and the output signal from an oscillator 50 are applied to a phase detector circuit 51. The oscillator provides a signal which pulsates at a frequency which is equal to the nominal frequency at which the stripes 29 are scanned by the electron beam and which is voltage controllable or adjustable over a predetermined range. The output voltage of phase detector 51 varies in amplitude as a function of the relative phase displacement between the oscillator output signal and the amplified index signal. The phase detector output signal is then fed back to the oscillator circuit to control its frequency is known manner to phase lock the oscillator output signal to the index signal. The oscillator then provides a steady or continuously pulsating signal which is synchronized with the scanning of the index stripes 29 by the electron beam.

The system illustrated in FIG. 1 is arranged for receiving color television broadcasts, for example, those transmitted according to conventional NTSC standards. It is to be understood, however, that signals derived according to other transmission systems, e.g., PAL or SECAM, may also be employed in the practice of the invention. Transmitted signals received at an antenna 53 are suitably amplified and detected by RF circuits indicated at 54. These RF circuits form no part of the present invention and are not described in detail herein. The detected modulation is applied to syn-separator circuits indicated generally at 55 and to color signal demodulator circuits indicated generally at 58. The syncseparator circuits 55 control the operation of deflection circuits 59 which energize yoke 47 in conventional manner to obtain the raster scanning of the electron beam emitted by gun 15 as described previously. The color demodulator circuits 58 decode or separate the composite video signal into a pair of component color signals each of which represents an image component of a respective color, e.g., red and green. These color signals are applied alternately to the grid 43 by a high frequency electronic switch or gating circuit 61 for varying the intensity of the electron beam to produce respective image components.

Gate circuit 61 is controlled by the signal provided by the oscillator 50 which signal is, as described previously, synchronized with the sweeping of the screen's stripes by the electron beam. The gating of the different color signal is thus also synchronized with the sweeping of the beam across the different portions of the screen. This alternate and synchronous application of the color signals causes the intensity of the electron beam emitted from gun 15 to be modulated in accordance with the red signal when the electron beam falls on the areas of screen 11 which are overlaid by the stripes 29 and to be modulated in accordance with the green signal when the beam falls on the intervening areas 30. Since the beam produces red light when it strikes the portions of screen 11 which are covered by the stripes 29 as described previously, it can be seen that the red signal creates image components in red light. The cyan signal on the other hand creates image components in white or substantially achromatic light, the white image components being interlaced with the red image components. The red and white component images produced on screen 11 combine to form a composite image which subjectively appears to include a full range of hues, including those which are not actually present in the colorimetric sense. This general two-color system of presenting color images is known in the art and provides an image of pleasing appearance wherein the hues appear more saturated than they really are.

Since the gating of the different color signals is controlled by an indexing signal which is substantially isolated from interfering noise by the interleaved arrangement of the index stripes 29 and the differential amplification of the signals obtained therefrom, precise synchronization of the signal gating is provided and thus high color resolution and separation are obtained.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A color display system for providing an image including a plurality of image components of different colors produced in response to respective color signals, said system comprising:
a phosphor viewing screen which, when energized by impinging electrons, emits light of a first color from first portions thereof and emits light of a second color from second portions thereof, said first and second portions being arranged in alternating, generally parallel stripes, said screen including conductive index stripes extending parallel to said stripes, alternate ones of said index stripes being connected together on one side of said screen and the intervening stripes being connected together on the other side of said screen thereby to provide a pair of interleaved comb-like conductive structures;
means including an electron gun for scanning said screen with a beam of electrons thereby to produce light and to generate a pulsating potential difference between said structures as said beam is scanned across said stripes, which pulsating potential difference comprises an indexing signal;
a differential amplifier having two inputs, one of said structures being connected to one of said inputs and the other structure being connected to the other input whereby said indexing signal is amplified and electrical noise signals picked up by said structures are suppressed;
an oscillator;
phase detector means responsive to the amplified indexing signal and the output signal from said oscillator for synchronizing said oscillator signal with the scanning of said stripes by said electron beam;
gate means, responsive to said oscillator signal and operating synchronously therewith, for sequentially applying said color signals to said gun to vary the electron beam intensity, the sequence in which said signals are applied corresponding to the order in which said portions are arranged on said screen, whereby said color signals produce image components in light of respective colors.

2. A color display system for providing an image including a plurality of image components of different colors produced in response to respective color signals, said system comprising
a viewing screen including a composite phosphor material spread uniformly over said screen, which phosphor material emits light of a said first color when energized by electrons having energies above a first predetermined level and emits light of said second color when energized by electrons having energies above a second predetermined level, said viewing screen including also a series of parallel conductive index stripes overlying said composite phosphor material on first portions of said screen, said stripes comprising an energy absorbing material for reducing the energy of impinging electrons from a level above said second level to a level intermediate said first and second levels whereby, when said screen is scanned by a beam of electrons having energies at said level above said second level, said first portions emit light of said first color and the intervening portions emit light of said second color, alternate ones of said index stripes being connected together on one side of said screen and the intervening index stripes being connected together on the other side of said screen thereby to provide a pair of interleaved comb-like conductive structures;
a high voltage supply for applying a fixed electron accelerating voltage to said screen;
means including an electron gun for scanning said screen with a beam of electrons thereby to produce light and to generate a pulsating potential difference between said structures as said beam is scanned across said stripes, which pulsating potential difference comprises an indexing signal;
a differential amplifier having two inputs, one of said structures being connected to one of said inputs and the other structure being connected to the other input whereby said indexing signal is amplified and electrical noise signals picked up by said structures are suppressed;
an oscillator;
phase detector means responsive to the amplified indexing signal and the output signal from said oscillator for synchronizing said oscillator signal with the scanning of said stripes by said electron beam; and
gate means, responsive to said oscillator output signal and operating synchronously therewith, for sequentially applying said color signals to said gun to vary the electron beam intensity, the sequence in which said signals are applied corresponding to the order in which said first and intervening portions are arranged on said screen, whereby said color signals produce image components in light of respective colors.

3. A color display system for providing an image including a plurality of image components of different colors produced in response to respective color signals, said system comprising:

a phosphor viewing screen which, when energized by impinging electrons, emits light of a first color from first portions thereof and emits light of a second color from second portions thereof, said first and second portions being arranged in alternating, generally parallel stripes, said screen including conductive index stripes extending parallel to said stripes, alternate ones of said index stripes being connected together on one side of said screen and the intervening stripes being connected together on the other side of said screen thereby to provide a pair of interleaved comb-like conductive structures;

an oscillator;

means including an electron gun for scanning said screen with a beam of electrons thereby to produce light and to generate a pulsating potential difference between said structures as said beam is scanned across said stripes, which pulsating potential difference comprises an indexing signal;

gate means, responsive to said indexing signal and operating synchronously therewith, for sequentially applying said color signals to said gun to vary the electron beam intensity, the sequence in which said signals are applied corresponding to the order in which said portions are arranged on said screen, whereby said color signals produce image components in light of respective colors;

and a phase detector responsive to said indexing signal and the output signal from said oscillator for synchronizing said oscillator signal with the scanning of said stripes by said electron beam.

References Cited

UNITED STATES PATENTS 3,372,229    3/1968    Barlow et al.
3,406,251   10/1968    Jones.

ROBERT L. GRIFFIN, Primary Examiner

R. P. LANGE, Assistant Examiner